US012620684B2

(12) United States Patent
Wang et al.

(10) Patent No.: US 12,620,684 B2

(45) Date of Patent: May 5, 2026

(54) SPATIAL FILTER, DRIVING METHOD THEREOF AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Feng Wang, Beijing (CN); Long Wang, Beijing (CN); Feng Qu, Beijing (CN); Biqi Li, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 338 days.

(21) Appl. No.: 18/273,768

(22) PCT Filed: Jul. 19, 2022

(86) PCT No.: PCT/CN2022/106387

§ 371 (c)(1),
(2) Date: Jul. 22, 2023

(87) PCT Pub. No.: WO2024/016144

PCT Pub. Date: Jan. 25, 2024

(65) Prior Publication Data

US 2024/0396195 A1 Nov. 28, 2024

(51) Int. Cl.
*H01P 1/20* (2006.01)

(52) U.S. Cl.
CPC .................................... *H01P 1/20* (2013.01)

(58) Field of Classification Search
CPC ................................ H01P 1/20; H01Q 15/00
See application file for complete search history.

(56) References Cited

U.S. PATENT DOCUMENTS 5,276,498 A * 1/1994 Galbraith ......... G01N 21/95623 250/550
5,917,458 A 6/1999 Ho et al.
(Continued)

FOREIGN PATENT DOCUMENTS

CN 102810763 A 12/2012
CN 102931455 A 2/2013
(Continued)

OTHER PUBLICATIONS

Xu et al., "Flexible liquid metal frequency selective surface with tunable second-order bandpass response," Conference Paper, Feb. 17, 202, 2020, pp. 725-726. IEEE International Symposium on Antennas and Propagation and North American Radio Science Meeting, Montreal, Canada, pub. by IEEE Xplore.
(Continued)

*Primary Examiner* — Andrea Lindgren Baltzell
*Assistant Examiner* — Kimberly E Glenn
(74) *Attorney, Agent, or Firm* — HOUTTEMAN LAW LLC

(57) ABSTRACT

A spatial filter, a driving method thereof and an electronic device are provided, and belong to the field of wireless communication technology. The spatial filter of the present disclosure includes at least one filter structure; wherein each filter structure includes a first substrate, a second substrate opposite to the first substrate, and a dielectric layer between the first substrate and the second substrate; wherein the first substrate includes a first dielectric substrate and at least one first electrode on a side of the first dielectric substrate close to the dielectric layer; the second substrate includes a second dielectric substrate and at least one second electrode on a side of the second dielectric substrate close to the dielectric layer; and the at least one first electrode intersects with the
(Continued)

at least one second electrode, which defines at least one resonant unit configured to filter an electromagnetic wave.

20 Claims, 10 Drawing Sheets

(56) References Cited

U.S. PATENT DOCUMENTS

| | | | |
|---|---|---|---|
| 9,978,682 | B1 | 5/2018 | Correale, Jr. et al. |
| 2003/0071763 | A1 | 4/2003 | Mckinzie, III et al. |
| 2012/0098628 | A1 | 4/2012 | Batchelor et al. |
| 2017/0366876 | A1 | 12/2017 | Agrawal et al. |

FOREIGN PATENT DOCUMENTS

| | | | | |
|---|---|---|---|---|
| CN | 103579771 | A | 2/2014 | |
| CN | 105811116 | A | 7/2016 | |
| CN | 107037517 | A | 8/2017 | |
| CN | 107086374 | A | 8/2017 | |
| CN | 107546491 | A | 1/2018 | |
| CN | 109193162 | A | 1/2019 | |
| CN | 109411896 | A | 3/2019 | |
| CN | 110364821 | A | 10/2019 | |
| CN | 111812908 | A | 10/2020 | |
| CN | 108469645 | B | 1/2021 | |
| JP | 2019024177 | A | 2/2019 | |
| JP | 2020057950 | A | 4/2020 | |
| WO | WO-2013182104 | A1 * | 12/2013 | ........... H01Q 17/008 |

OTHER PUBLICATIONS

Yang, “Research on circularly polarized antenna loaded with multi-layer frequency selective surface,” Masters Thesis, Jan. 15, 2022, Southeast University, Nanjing, China.

Lv et al., “Tunable liquid crystal frequency selective surface with the compact unit cell, large tuning range, and the passband of flat-top and sharp roll-off,” J. Phys. D: Appl. Phys. May 24, 2021, 9 pgs., vol. 54. IOP Publishing, United Kingdom.

* cited by examiner

SPATIAL FILTER, DRIVING METHOD THEREOF AND ELECTRONIC DEVICE

TECHNICAL FIELD

The present disclosure relates to the field of wireless communication technology, and in particular to a spatial filter, a method for driving a spatial filter and an electronic device.

BACKGROUND

A spatial filter has a filtering characteristic changing with a frequency when filtering an electromagnetic wave incident from a space. The spatial filter may be considered as a frequency selective surface, i.e., FSS. The frequency selective surface is a two-dimensional periodic structure including periodic apertures, patches, or a combination of the apertures and the patches. The frequency selective surface is generally divided into having band pass type or band stop type filtering characteristics. The band pass type frequency selective surface generally may allow an electromagnetic wave in a certain specific frequency band to completely pass through the frequency selective surface, and may completely reflect or absorb an electromagnetic wave outside the frequency band; while the band stop type frequency selective surface generally absorbs or reflects an electromagnetic wave in a certain frequency band, and an unexpected electromagnetic wave in other frequency bands may normally pass through the frequency selective surface. The filtering characteristics of the conventional FSS are mainly based on a resonance mechanism of the FSS, with an operating wavelength depending on a period length between units or a resonant frequency of the unit itself.

The spatial filter or the frequency selective surface has a great practical application value. For example, with the rapid development of the mobile internet, a low frequency communication resource is almost completely utilized, so that an electromagnetic interference, especially frequency multiplication interference, between different communication systems is gradually intensified, which has seriously affected the normal communication. The spatial filter may be applied to a housing of an electronic device for preventing the electromagnetic interference. For another example, the frequency selective surface can reduce a radar cross section (RCS) of an aircraft, or form a common aperture multiband nested antenna, or be applied to an antenna housing of a base station for assisting the antenna filtering.

Generally, the spatial filter has a structure with a fixed frequency, and once a manufacturing process is completed, the achievable filter response characteristic or operating frequency band is fixed, which greatly limits the practical application of the spatial filter. The adjustable spatial filter generally has difficulty in controlling individual units, and mainly has difficulty in arranging control lines when the number of units in the spatial filter array is increased. Therefore, the current spatial filters are based on integral tuning and do not use a way of controlling the individual units.

SUMMARY

The present disclosure is directed to solve at least one of the technical problems in the prior art, and provides a spatial filter, a method for driving a spatial filter, and an electronic device.

In a first aspect, an embodiment of the present disclosure provides a spatial filter, including at least one filter structure; wherein each filter structure includes a first substrate, a second substrate opposite to the first substrate, and a dielectric layer between the first substrate and the second substrate; wherein the first substrate includes a first dielectric substrate and at least one first electrode on a side of the first dielectric substrate close to the dielectric layer; the second substrate includes a second dielectric substrate and at least one second electrode on a side of the second dielectric substrate close to the dielectric layer; and the at least one first electrode intersects with the at least one second electrode, which defines at least one resonant unit configured to filter an electromagnetic wave.

In some embodiments, the at least one first electrode includes a plurality of first electrodes and the at least one second electrode includes a plurality of second electrodes; the plurality of first electrodes extend along a first direction and are arranged side by side along a second direction; the plurality of second electrodes extend along the second direction, and are arranged side by side along the first direction; and the plurality of first electrodes intersect with the plurality of second electrodes, which defines a plurality of resonant units arranged in an array.

In some embodiments, intervals between every adjacent first electrodes are the same, and/or intervals between every adjacent second electrodes are the same.

In some embodiments, the plurality of first electrodes have a same size and/or the plurality of second electrodes have a same size.

In some embodiments, an interval between any two adjacent first electrodes is a first interval, and an interval between any two adjacent second electrodes is a second interval; and the first interval and the second interval are equal to each other.

In some embodiments, widths of the plurality of first electrodes and of the plurality of second electrodes are equal to each other.

In some embodiments, each resonant unit further includes a first opening in a corresponding first electrode, and/or a second opening in a corresponding second electrode; each resonant unit includes the first opening in the first electrode, and orthographic projections of the first opening and the second electrode on the first dielectric substrate intersects with each other; and/or each resonant unit includes the second opening in the second electrode, and orthographic projections of the second opening and the first electrode on the first dielectric substrate intersects with each other.

In some embodiments, the at least one filter structure includes a plurality of stacked filter structures.

In some embodiments, the first dielectric substrate of one of the adjacent filter structures is used as the second dielectric substrate of the other one of the adjacent filter structures.

In some embodiments, the first dielectric substrate of one of the adjacent filter structures and the second dielectric substrate of the other one of the adjacent filter structures are adhered together by a first adhesive layer.

In some embodiments, orthographic projections of the resonant units in the plurality of filter structures on the first dielectric substrate do not overlap with each other.

In some embodiments, the dielectric layer includes a liquid crystal layer.

In some embodiments, the spatial filter further includes a first alignment layer on a side of a layer, where the at least one first electrode is located, close to the liquid crystal layer;

and a second alignment layer on a side of a layer, where the at least one second electrode is located, close to the liquid crystal layer.

In some embodiments, extending directions of the at least one first electrode and of the at least one second electrode in the at least one filter structure are orthogonal to each other.

In some embodiments, each first electrode has a thickness in a range of 2 μm to 5 μm and/or each second electrode has a thickness in a range of 2 μm to 5 μm.

In some embodiments, the dielectric layer has a thickness in a range from 5 μm to 200 μm.

In a second aspect, an embodiment of the present disclosure provides a method for driving the spatial filter, including: changing a dielectric constant of the dielectric layer by applying voltages to the at least one first electrode and the at least one second electrode, to change a resonance frequency of the at least one resonant unit to filter the electromagnetic wave.

In some embodiments, the at least one first electrode includes a plurality of first electrodes and the at least one second electrode includes a plurality of second electrodes; and the applying the voltages to the at least one first electrode and the at least one second electrode includes: applying the same voltage to the plurality of first electrodes and applying different voltages to at least some of the plurality of second electrodes.

In some embodiments, the at least one first electrode includes a plurality of first electrodes and the at least one second electrode includes a plurality of second electrodes; and the applying the voltages to the at least one first electrode and the at least one second electrode includes: applying different voltages to at least some of the plurality of first electrodes, and applying different voltages to at least some of the plurality of second electrodes.

In a third aspect, an embodiment of the present disclosure provides an electronic device, which includes the spatial filter of any one of the above embodiments.

DETAIL DESCRIPTION OF EMBODIMENTS

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

Figure 1:
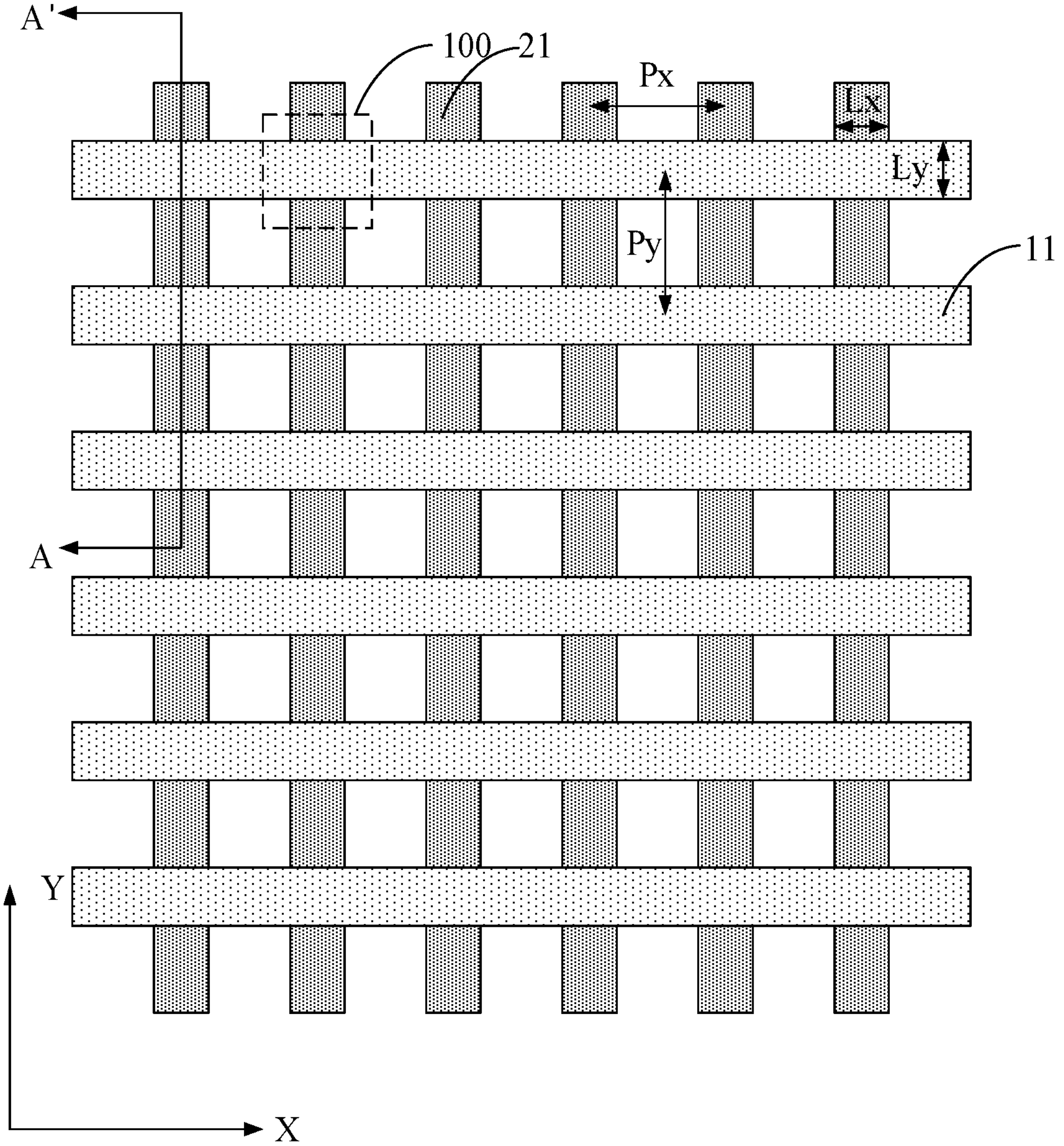
FIG. 1 is a top view of a spatial filter according to an embodiment of the present disclosure.
Figure 2:
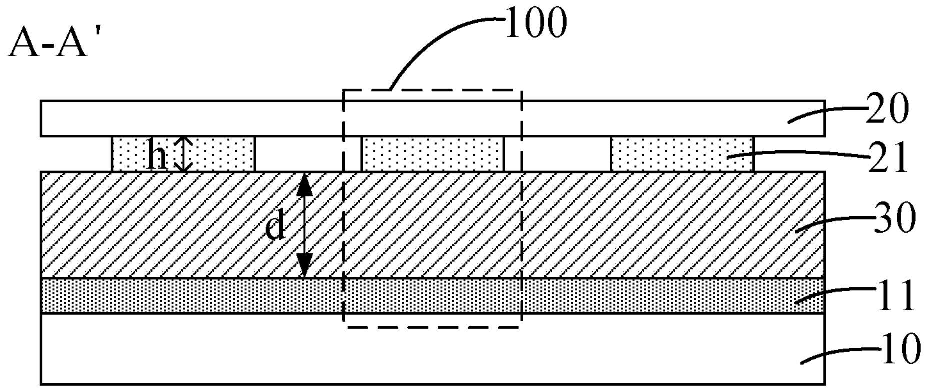
FIG. 2 is a cross-sectional view of a spatial filter of FIG. 1 along a line A-A.
Figure 3:
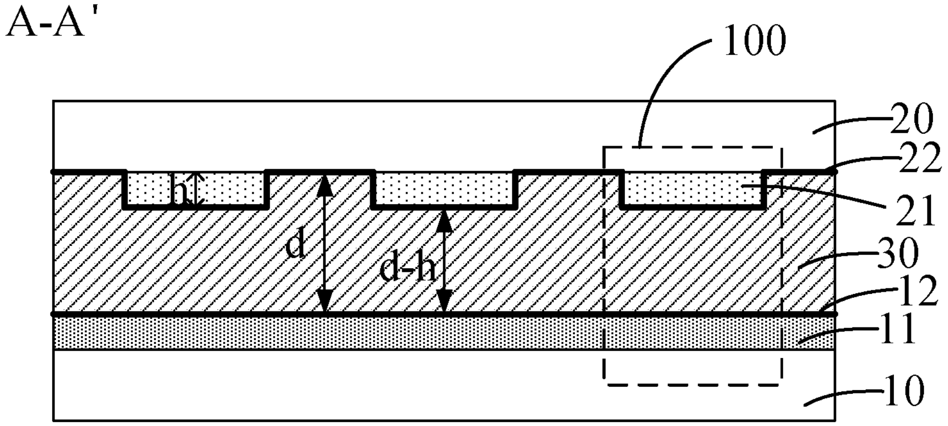
FIG. 3 is a cross-sectional view of another spatial filter of FIG. 1 along a line A-A.

In a first aspect, FIG. 1 is a top view of a spatial filter according to an embodiment of the present disclosure. FIG. 2 is a cross-sectional view of a spatial filter of FIG. 1 along a line A-A'. FIG. 3 is a cross-sectional view of another spatial filter of FIG. 1 along a line A-A'. With reference to FIGS. 1 to 3, embodiments of the present disclosure provide a spatial filter including at least one layer of filter structure (at least one filter structure). Each filter structure includes a first substrate, a second substrate disposed opposite to the first substrate, and a dielectric layer 30 disposed between the first substrate and the second substrate. The first substrate includes a first dielectric substrate 10 and at least one first electrode 11; the at least one first electrode 11 is located on a side of the first dielectric substrate 10 close to the tunable dielectric layer 30. The second substrate includes a second dielectric substrate 20 and at least one second electrode 21; the at least one second electrode 21 is located on a side of the second dielectric substrate 20 close to the tunable dielectric layer 30. In the embodiment of the present disclosure, the at least one first electrode 11 on the first dielectric substrate 10 intersects with the at least one second electrode 21 on the second dielectric substrate 20, which defines at least one resonant unit 100, that is, resonant cavities formed by the at least one first electrode 11, the tunable dielectric layer 30, and the at least one second electrode 21 are formed at a position where orthographic projections of the at least one first electrode 11 and the at least one second electrode 21 on the first dielectric substrate 10 coincide with each other. Each resonant unit 100 is configured to filter an electromagnetic wave.

In some examples, the filter structure may include a plurality of first electrodes 11 and a plurality of second electrodes 21. In the embodiments of the present disclosure, as an example, the plurality of first electrodes 11 and the plurality of second electrodes 21 are included for description. The number of the first electrodes 11 and the number of the second electrodes 21 in each filter structure may be the same or different, which is not limited in the embodiment of the present disclosure. For each filter structure, the plurality of first electrodes 11 extend in a first direction X and the plurality of second electrodes 21 extend in a second direction Y, the first direction X and the second direction Y are different from each other; the plurality of first electrodes 11 are arranged side by side along the second direction Y at intervals, and the plurality of second electrodes 21 are arranged side by side along the first direction X at intervals. For any first electrode 11, the first electrode intersects with the plurality of second electrodes 21. In this case, the plurality of first electrodes 11 intersect with the plurality of second electrodes 21 to define a plurality of resonant units 100 arranged in an array.

It should be noted that in FIG. 1, as an example, the first direction X and the second direction Y are orthogonal to each other, that is, extending directions of the first electrodes 11 and the second electrodes 21 are orthogonal to each other, but it should be understood that it is not necessary in the embodiment of the present disclosure that the first direction X and the second direction Y are orthogonal to each other, as long as there is a certain angle between the extending directions of the first electrodes 11 and the second electrodes 21

Further, for each filter structure, intervals (distances) between the first electrodes 11 may be the same, and intervals between the second electrodes 21 may be the same. The interval between adjacent first electrodes 11 refers to a distance between central lines of the first electrodes 11 extending along the first direction X. The interval between adjacent second electrodes 21 refers to a distance between central lines of the second electrodes 21 extending along the second direction Y.

Specifically, for each filter structure, the interval between the adjacent first electrodes 11 is a first interval (distance) Py, the interval between the adjacent second electrodes 21 is a second interval (distance) Px, and the first interval Py and the second interval Px may be equal to each other or different from each other. In the embodiment of the present disclosure, as an example, the first interval Py and the second interval Px may be equal to each other.

In some examples, the first electrodes 11 have the same size and the second electrodes 21 have the same size. It should be noted that in the embodiment of the present disclosure, the same size means the same length, the same width and the same thickness. With such the arrangement, the structure is easy to manufacture and implement.

In some examples, for each filter structure, the dielectric layer 30 may be a dielectric layer 30 with a non-adjustable dielectric constant, or a dielectric layer 30 with an adjustable dielectric constant.

For example: as shown in FIG. 2, when the dielectric layer 30 is a dielectric layer 30 with a non-adjustable dielectric constant, the dielectric layer 30 may be a glass substrate. In this case, the dielectric layer 30 has a certain supporting force, the first electrodes 11 and the second electrodes 21 are respectively disposed on two opposite sides of the dielectric layer 30. If a thickness of the dielectric layer 30 is d, a distance between the first electrodes 11 and the second electrodes 21 is d. With continued reference to FIG. 2, the first dielectric substrate 10 for supporting the first electrodes 11 may be a flexible substrate, and the second dielectric substrate 20 for supporting the second electrodes 21 may be a glass substrate.

With continued reference to FIG. 2, since the dielectric constant of the dielectric layer 30 is not adjustable, the filter formed by applying the filter structure may only filter an electromagnetic wave in a specific frequency band. A band pass type filter or a band stop type filter can be realized by providing the interval between the adjacent first electrodes 11 and the interval between the adjacent second electrodes 21. Specifically, when the interval between the adjacent first electrodes 11 and the interval between the adjacent second electrodes 21 are relatively large, the band stop type filter may be formed, and when the interval between the adjacent first electrodes 11 and the interval between the adjacent second electrodes 21 are relatively small, the band pass type filter may be formed.

For example: as shown in FIG. 3, when the dielectric layer 30 is the tunable dielectric layer 30, the tunable dielectric layer 30 may be a liquid crystal layer. Further, when the tunable dielectric layer 30 is the liquid crystal layer, a first alignment layer 12 is disposed on a side of a layer, where the first electrodes 11 are located, close to the liquid crystal layer; and a second alignment layer 22 is disposed on a side of a layer, where the second electrodes 21 are located, close to the liquid crystal layer. The first alignment layer 12 and the second alignment layer 22 are configured to provide an initial pre-tilt angle for liquid crystal molecules in the liquid crystal layer, so as to ensure that the dielectric constant of the liquid crystal layer can be changed by a maximum when voltages are applied to the first electrodes 11 and the second electrodes 21.

In the embodiment of the present disclosure, the thicknesses of the first electrodes 11 and the second electrodes 21 may be equal to each other or different from each other. In the embodiment of the present disclosure, as an example, the thicknesses of the first electrodes 11 and the second electrodes 21 are equal to each other, where a thickness of each of the first electrodes 11 and the second electrodes 21 is h, which is about in a range of 2 μm to 5 μm. The thickness of the liquid crystal layer is d, which is about in a range of 5 μm to 200 μm. If the liquid crystal layer has no supporting capability, a distance between the first electrodes 11 and the second electrodes 21 is d-h. With continued reference to FIG. 3, by applying different voltages to the first electrodes 11 and the second electrodes 21, a dielectric constant of each of portions of the liquid crystal layer at positions where the first electrodes 11 intersects with the second electrodes 21 may be adjusted, and thus a filter frequency of each of the resonant units 100 defined by the first electrodes 11 intersecting with the second electrodes 21 may be tuned. That is, a tuning frequency of each of the resonant units 100 may be changed only by changing a magnitude of each of the voltages applied to the first electrodes 11 and the second electrodes 21, such the structure is simple and easy to implement. In addition, in the present embodiment, the adjustment of the resonant frequency can be achieved for each resonant unit 100 by adjusting the voltages applied to the first electrode 11 and the second electrode 21 corresponding to the resonant unit, that is, each resonant unit 100 in the filter structure of the embodiment of the present disclosure can be controlled individually.

The spatial filter according to the embodiment of the present disclosure is described below with reference to specific examples.

In a first example, the spatial filter includes only one filter structure in which the first electrodes 11 and the second electrodes 21 are arranged orthogonally. Widths of the first electrodes 11 and the second electrodes 21 are equal to each other, and the distance between the first electrodes 11 disposed adjacent to each other, i.e., the first distance Py, is equal to the distance between the second electrodes 21 disposed adjacent to each other, i.e., the second distance Px. The distance between the first electrodes 11 and the second electrodes 21 is much smaller than the width of each first electrode 11 and the width of each second electrode 21. The dielectric constant of the dielectric layer 30 is not variable.

Figure 4:
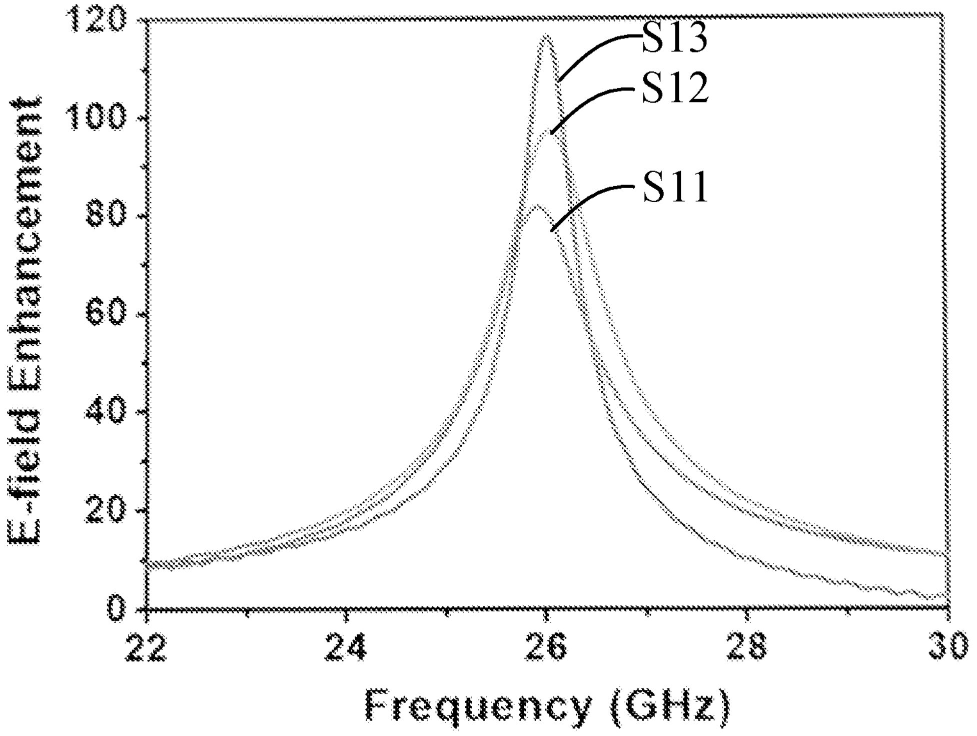
FIG. 4 is a resonant frequency-electromagnetic wave enhancement curve of a spatial filter shown in FIG. 2 with first/second distances of 6.4 mm, 8 mm and 9.6 mm, respectively.
Figure 5:
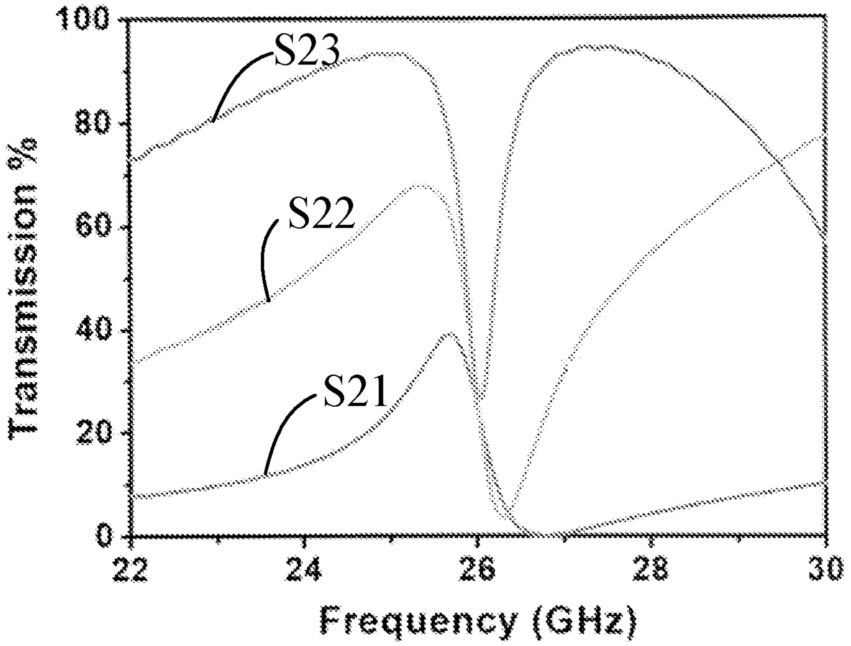
FIG. 5 is a resonant frequency-transmission curve of a spatial filter shown in FIG. 2 with first/second distances of 6.4 mm, 8 mm and 9.6 mm, respectively.

In this case, if a polarization direction of an incident spatial wave is perpendicular to the first electrodes 11, a central wavelength λ of a filter band of the spatial filter is about 2n×Ly, n is the refractive index of the liquid crystal layer, Ly is the width of each first electrode 11; if the polarization direction of the incident spatial wave is perpendicular to the second electrodes 21, the central wavelength λ of the filter band of the spatial filter is about 2n×Lx, n is the refractive index of the dielectric layer 30, and Lx is the width of each second electrode 21. For a spatial millimeter wave of 27 GHz band with a vacuum wavelength of about 11.1 mm, Lx or Ly is about 3.2 mm if the thickness d of the dielectric layer 30 is 40 μm and the dielectric constant of the dielectric layer 30 is 3. FIG. 4 is a resonant frequency-electromagnetic wave enhancement curve of a spatial filter shown in FIG. 2 with first/second distances Py/Px of 6.4 mm, 8 mm and 9.6 mm, respectively. FIG. 5 is a resonant frequency-transmission curve of a spatial filter shown in FIG. 2 with first/second distances Py/Px of 6.4 mm, 8 mm and 9.6 mm, respectively. As shown in FIG. 4, S11 represents an electromagnetic wave transmission curve when the first distance Py/the second distance Px is 6.4 mm; S12 represents an electromagnetic wave transmission curve when the first distance Py/the second distance Px is 8 mm; S13 represents an electromagnetic wave transmission curve when the first distance Py/the second distance Px is 9.6 mm; as can be seen from FIGS. 4 and 5, a strong resonance is formed in areas where the first electrodes 11 and the second electrodes 21 coincide with each other in a frequency range between 26 GHZ and 27 GHz. Accordingly, a Fano resonance is formed on each transmission curve. It can be seen that when the first distance Py/the second distance Px is large, a transmission valley is formed at a frequency of 26 GHz due to absorption caused by the resonance, which can be used as a band stop type filter. When the first distance Py/the second distance Px is small, a transmission peak is formed around a frequency of 26 GHZ, which can be used to form a band pass type filter.

Figure 6:
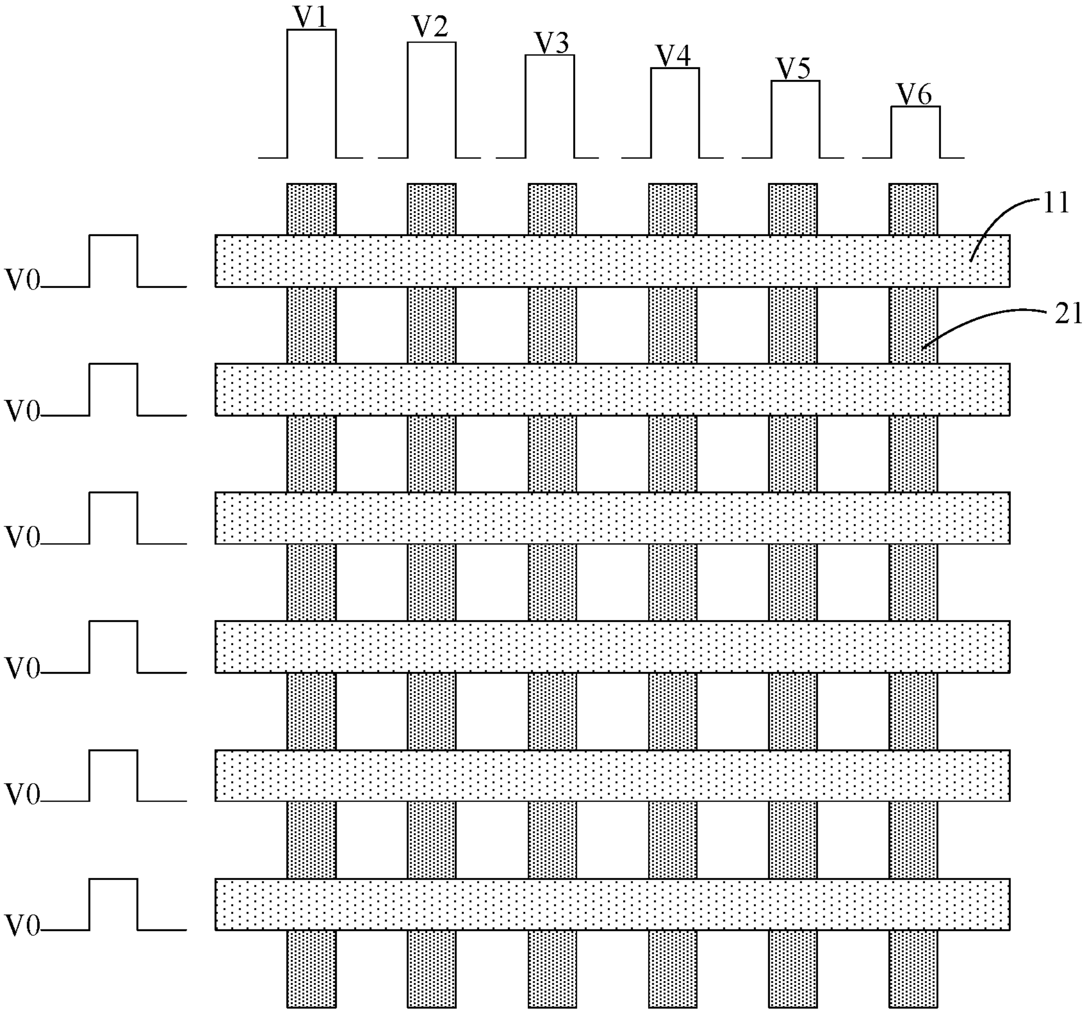
FIG. 6 is a schematic diagram of applying a voltage to a first electrode and a second electrode of a spatial filter shown in FIG. 3.
Figure 7:
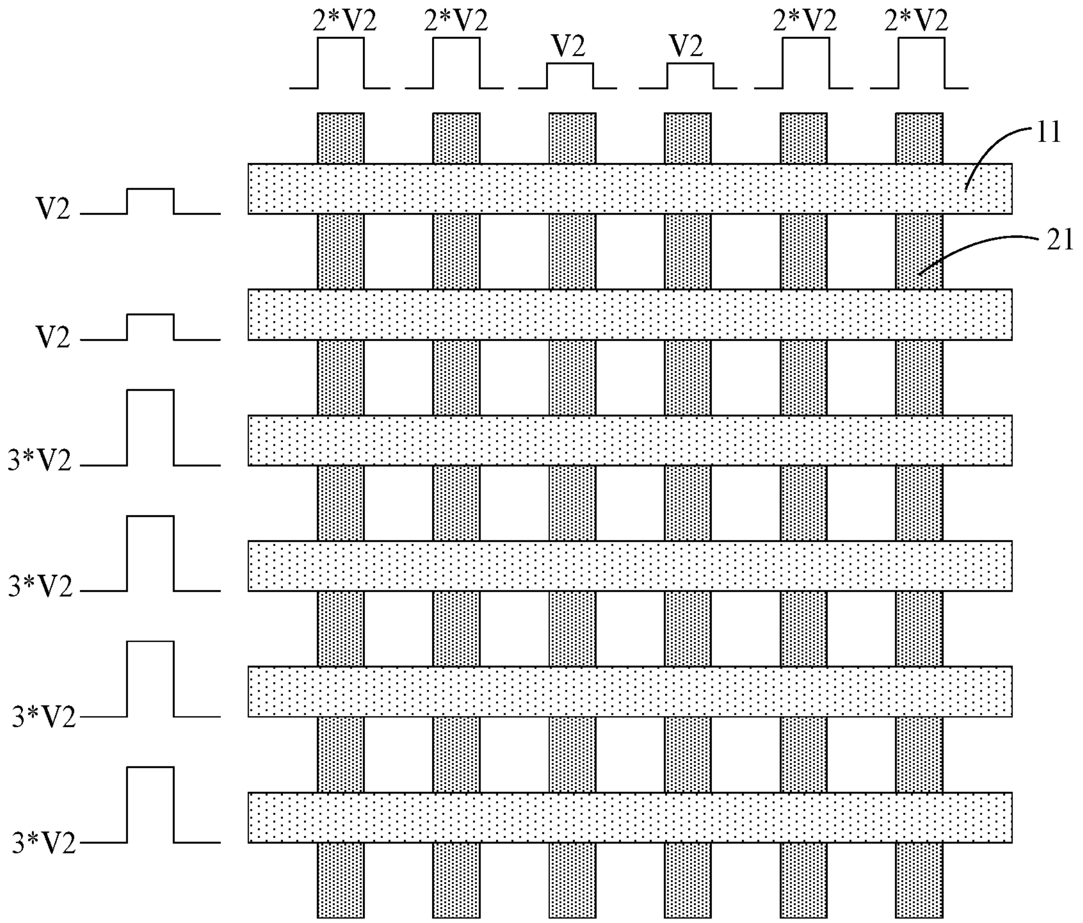
FIG. 7 is another schematic diagram of applying voltages to a first electrode and a second electrode of a spatial filter shown in FIG. 3.
Figure 8:
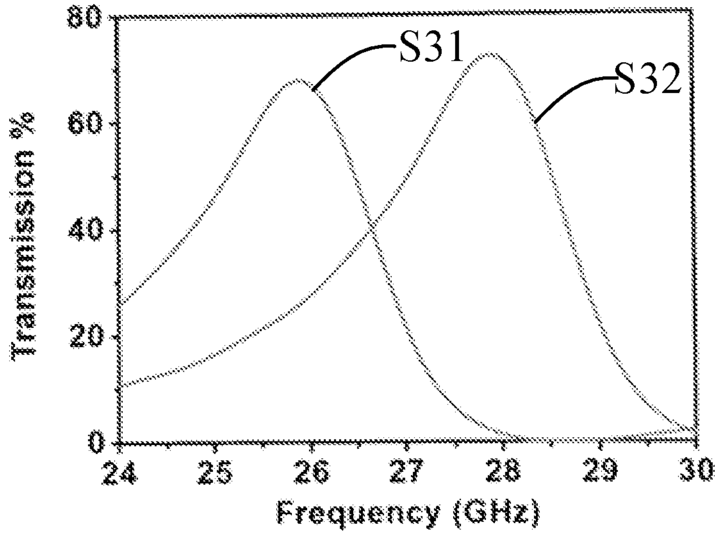
FIG. 8 is a resonant frequency-transmission curve with/without voltages applied to a first electrode and a second electrode of a spatial filter shown in FIG. 3.

In a second example, the second example is substantially the same as the first example, except that the dielectric layer 30 employs the liquid crystal layer. FIG. 6 is a schematic diagram of applying a voltage to a first electrode 11 and a second electrode 21 of a spatial filter shown in FIG. 3. As shown in FIG. 6, different voltages may be applied to the second electrodes 21, wherein voltages V1 to V7 are applied to the first one to the last one of the second electrodes 21, and the same voltage V0 is applied to the first electrodes 11, so that the liquid crystal molecules in the resonant units 100 in each column are rotated by the same amplitude, which results in the same filter curve, and the filter curves on different columns are gradually offset in frequency. FIG. 7 is another schematic diagram of applying a voltage to a first electrode 11 and a second electrode 21 of a spatial filter shown in FIG. 3. As shown in FIG. 7, when a voltage difference between the first electrode 11 and the second electrode 21 corresponding to each other reaches V2, the liquid crystal molecules can change from an initial in-plane horizontal orientation to a vertical orientation, the same voltage of 2×V2 is applied to the first, second, fifth and sixth ones of the second electrodes 21, and the same voltage of V2 is applied to the third and fourth ones of the second electrodes 21; the same voltage of 2×V2 is applied to the first and second ones of the first electrodes 11, and the same voltage of 3×V2 is applied to the third, fourth, fifth and sixth ones of the first electrodes 11. In this case, since there is no voltage difference between the first electrode 11 and the second electrode 21 in the resonant units 100 in some regions, the liquid crystal molecules are not rotated, and the liquid crystal molecules in the resonant unit 100 in the other regions are completely rotated, so that a center frequency point of each of the filter curves in some regions is completely different from that each of the filter curves in other regions, and the filter performance in some regions can be controlled independently. FIG. 8 is a resonant frequency-transmission curve with/without a voltage applied to a first electrode 11 and a second electrode 21 of a spatial filter shown in FIG. 3. As shown in FIG. 8, S31 represents a resonant frequency-transmission curve when voltages are applied to the first electrodes 11 and the second electrodes 21, and S32 represents a resonant frequency-transmission curve when voltages are not applied to the first electrodes 11 and the second electrodes 21.

Figure 9:
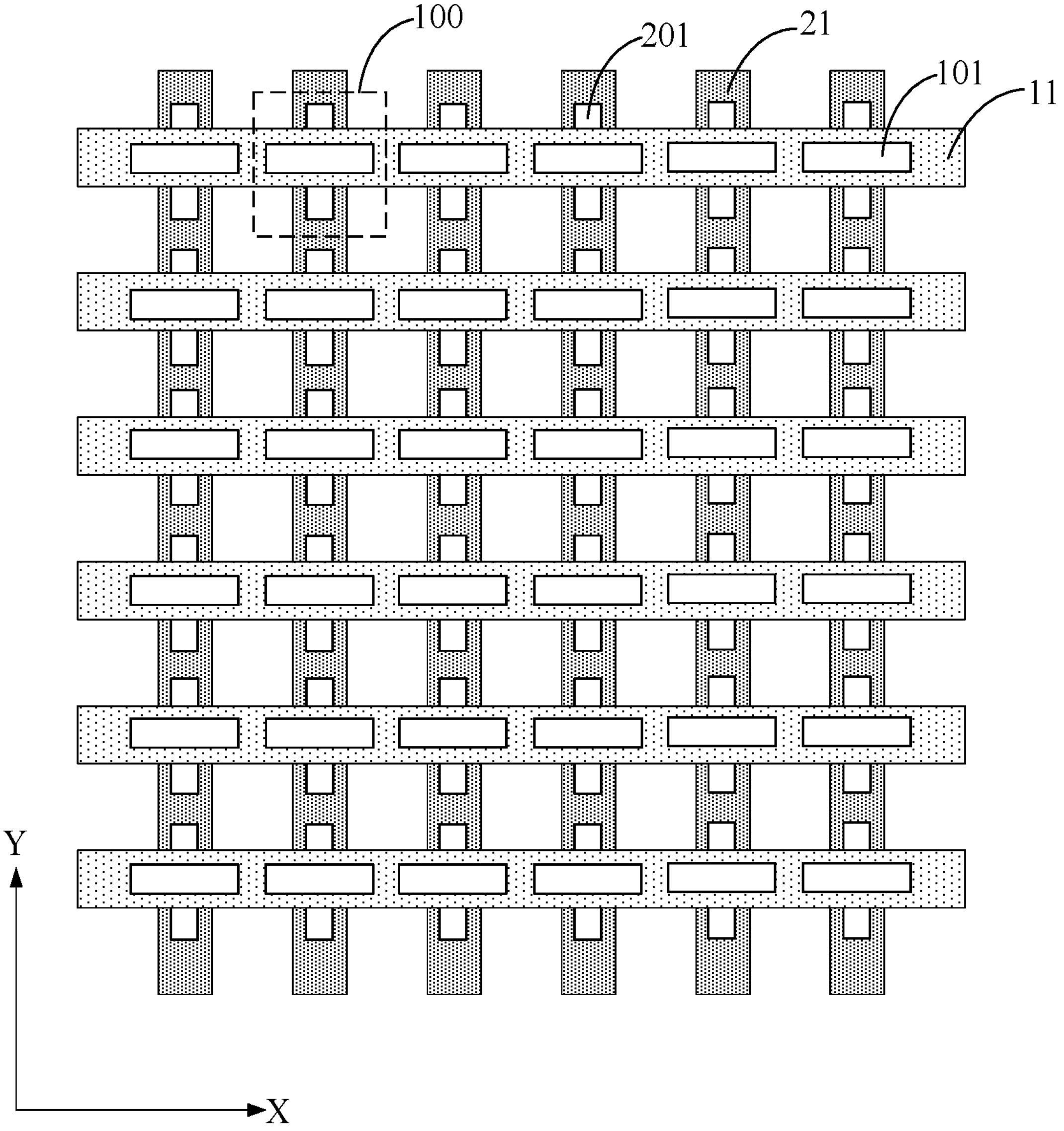
FIG. 9 is a top view of another spatial filter according to an embodiment of the present disclosure.

In some examples, FIG. 9 is a top view of another spatial filter according to an embodiment of the present disclosure. As shown in FIG. 9, when the spatial filter according to the embodiment of the present disclosure implements a band pass filtering function, the first distance Py between the first electrodes 11 disposed adjacently and the second distance Px between the second electrodes 21 disposed adjacently are required to be small. In this case, although the electromagnetic wave may form a transmission peak in a specific frequency band, the transmission is relatively low and the filtering loss is relatively large, so that each resonant unit 100 further includes a first opening 101 formed in the first electrode 11 and a second opening 201 formed in the second electrode 21. Orthographic projections of the first opening 101 of the first electrode 11 of the resonant unit 100 and the second electrode 21 on the first dielectric substrate 10 intersect with each other; orthographic projections of the second opening 201 of the second electrode 21 of the resonant unit 100 and the first electrode 11 on the first dielectric substrate 10 intersect with each other. When each resonant unit 100 includes both the first opening 101 and the second opening 201, the resonant unit 100 can implement dual-polarization filtering characteristics.

Further, a size of the first opening 101 and a size of the second opening 201 may be the same or different. In the embodiment of the present disclosure, the size of the first opening 101 and the size of the second opening 201 are the same, as an example, that is, a length of the first opening 101 and a length of the second opening 201 are the same and are Sx, and a width of the first opening 101 and a width of the second opening 201 are the same and are Sy.

Figure 10:
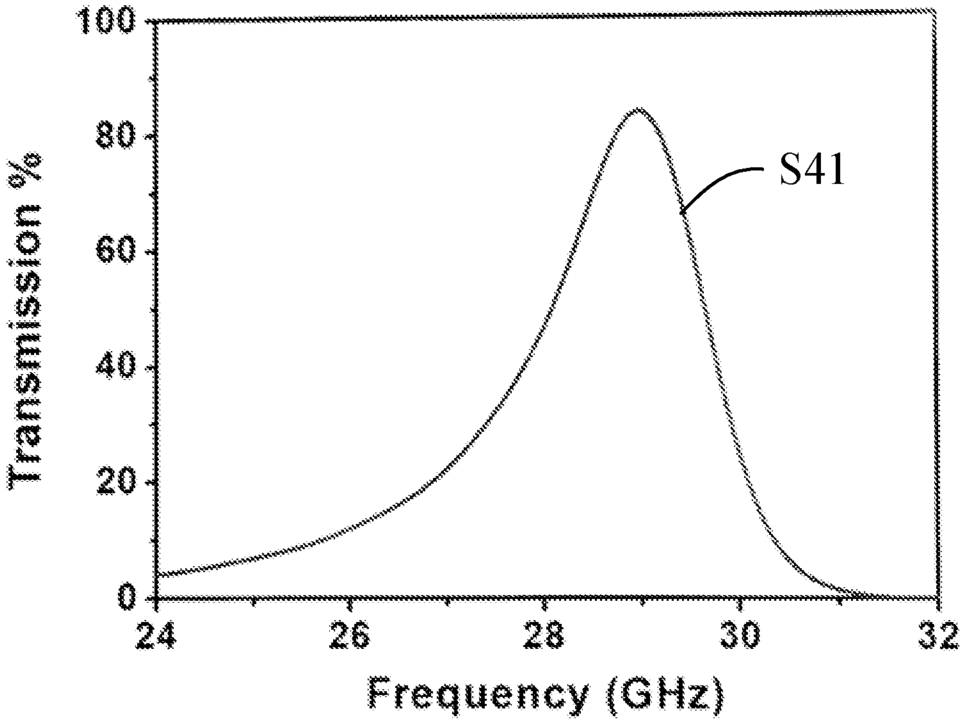
FIG. 10 is a resonant frequency-transmission curve for a spatial filter shown in FIG. 9.

Specifically, when the first electrode 11 is not provided with the first opening 101 and the second electrode 21 is not provided with the second opening 201, the first distance Py/the second distance Px is at least greater than a half wavelength in the dielectric layer 30. When the first electrode 11 is provided with the first opening 101 and the second electrode 21 is provided with the second opening 201, the first distance Py/the second distance Px may be reduced to be in the order of 1/10 to 1/6 of a vacuum wavelength or in the order of ⅕ to ⅓ of a dielectric wavelength, depending on values of Sx and Sy. Here, the value of Sx is smaller than that of each of Px and Py, and the value of Sy is smaller than that of each of Lx and Ly. For example: for the liquid crystal layer of $\varepsilon_{\|}$=3.0169 (tan $\delta$=0.0035) or $\varepsilon_{\perp}$=2.3616 (tan $\delta$=0.0128), when the liquid crystal layer is aligned perpendicular to the first dielectric substrate 10, the liquid crystal layer has a thickness of 20 μm, Px=Py=1.6 mm, Lx=Ly=0.68 mm, Sx=1.5 mm, Sy=0.28 mm, the transmission curve is as shown in FIG. 10. It can be seen that compared to the structure of FIG. 1 in which the first opening 101 is not provided in the first electrode 11 and the second opening 201 is not provided in the second electrode 21, the structure in which the first opening 101 is provided in the first electrode 11 and the second opening 201 is provided in the second electrode 21 forms a better transmission peak, and the maximum transmission increases to 80%, and the band edge roll-off is fast.

Figure 11:
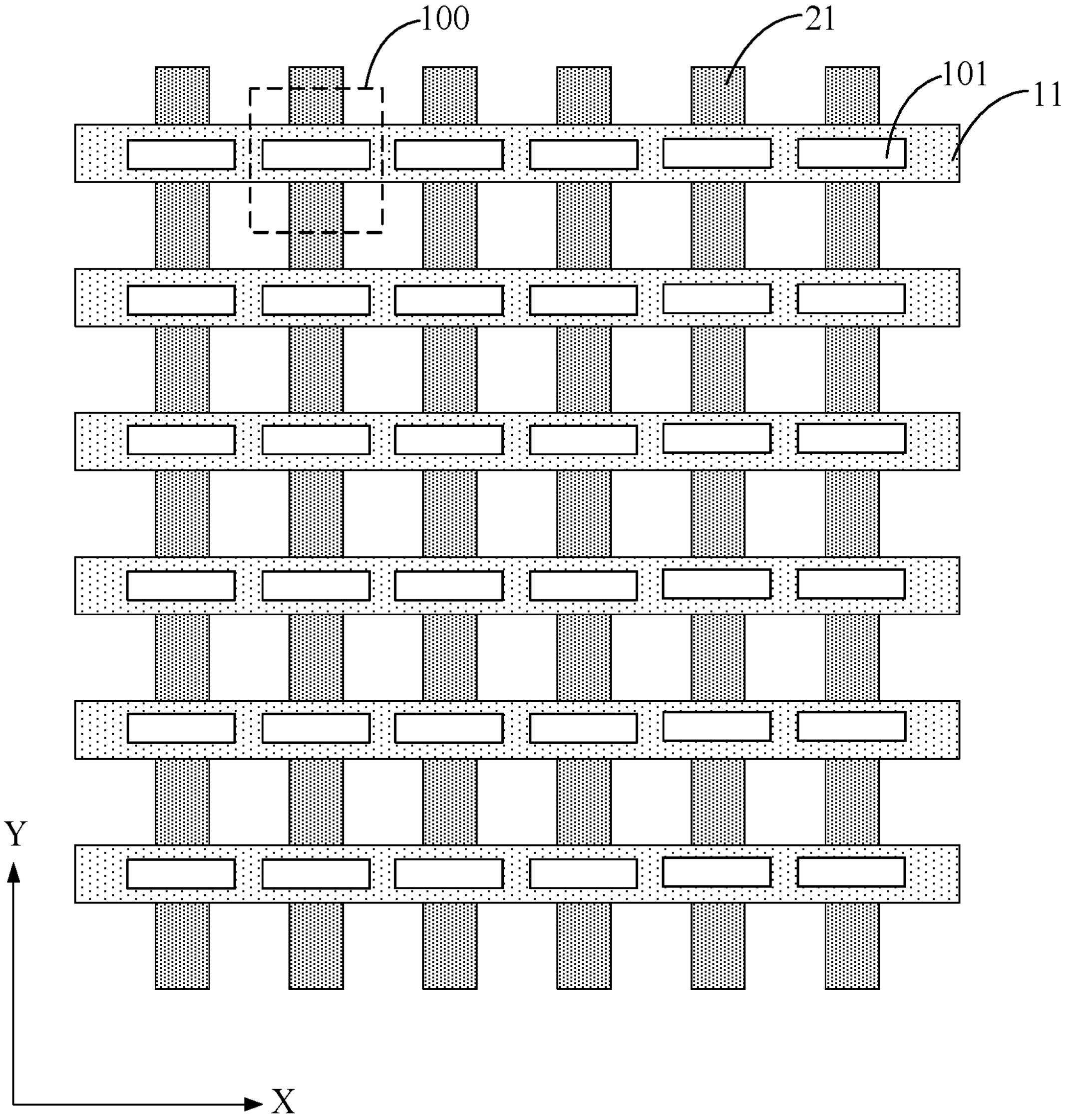
FIG. 11 is a top view of yet another spatial filter according to an embodiment of the present disclosure.
Figure 12:
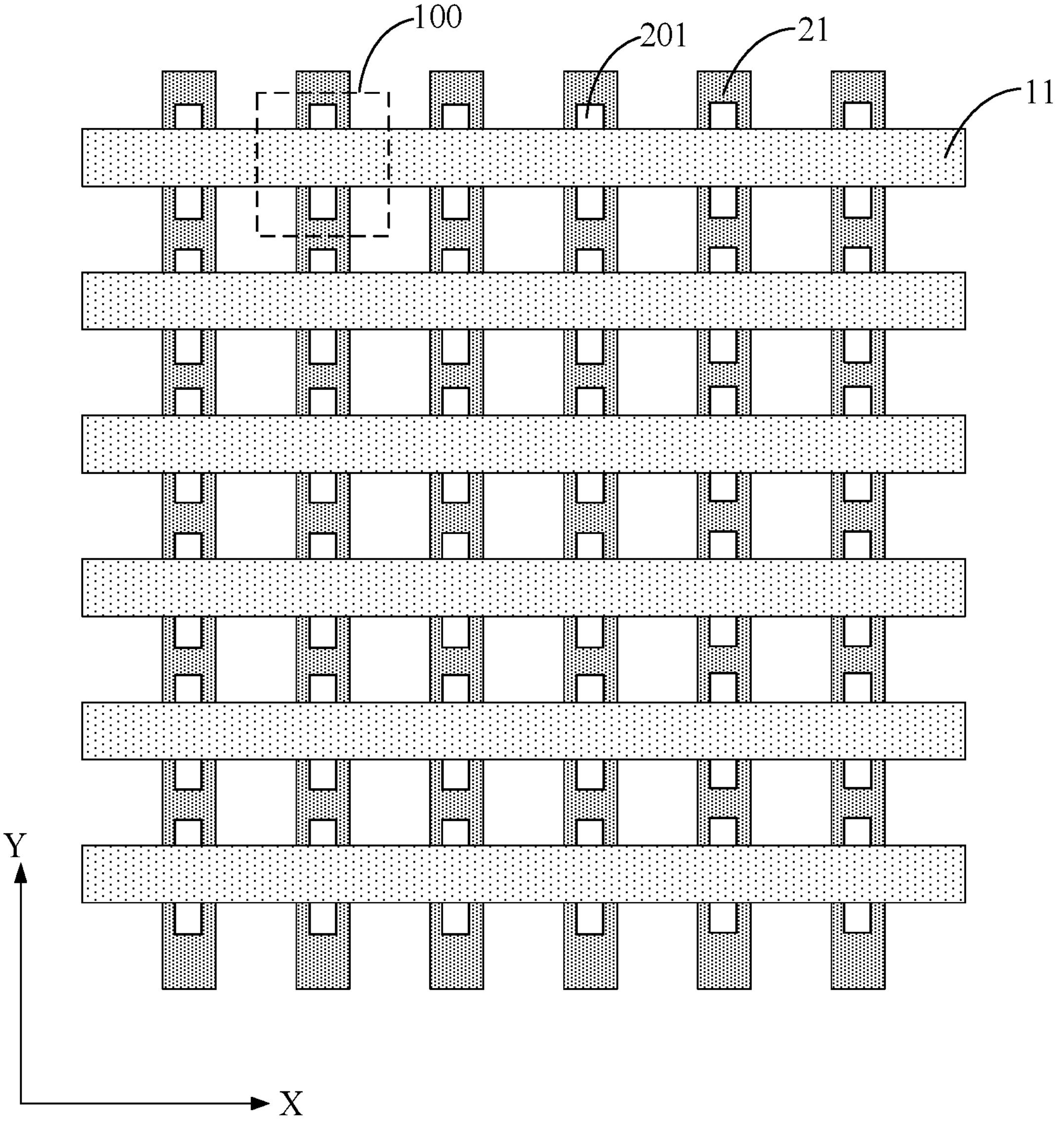
FIG. 12 is a top view of yet another spatial filter according to an embodiment of the present disclosure.

In some examples, FIG. 11 is a top view of yet another spatial filter according to an embodiment of the present disclosure. FIG. 12 is a top view of yet another spatial filter according to an embodiment of the present disclosure. As shown in FIGS. 11 and 12, for each resonant unit 100, it is also possible to form the first opening 101 only in the first electrode 11, or to form the second opening 201 only in the second electrode 21.

Figure 13:
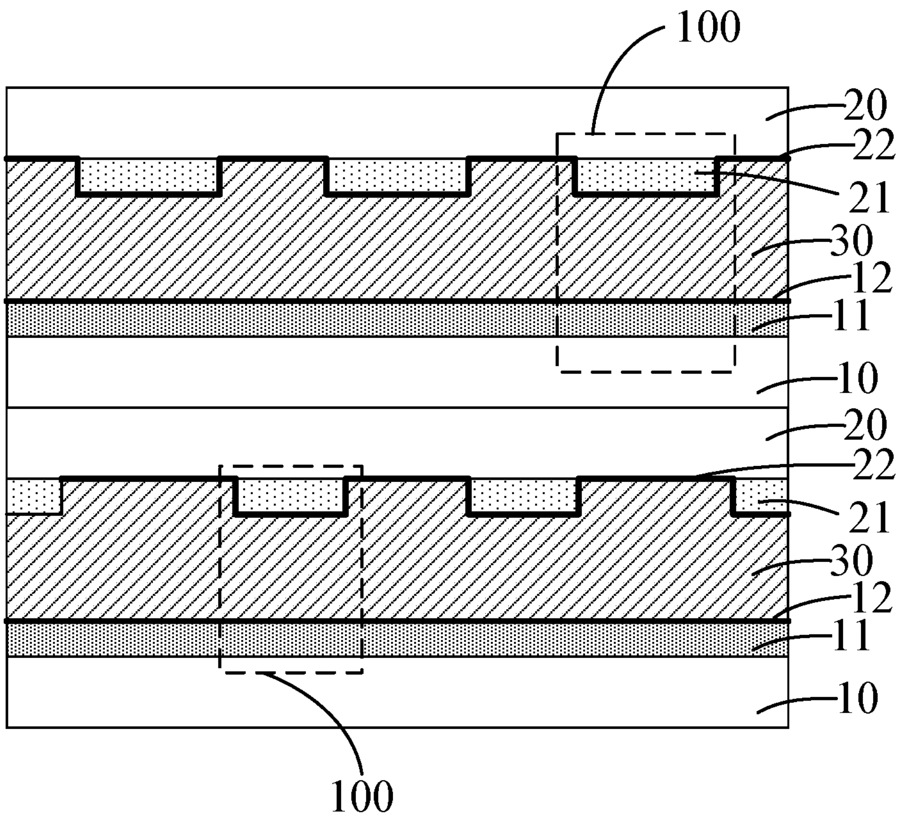
FIG. 13 is a top view of yet another spatial filter according to an embodiment of the present disclosure.

In the above, only one filter structure is included in the spatial filter as an example. FIG. 13 is a top view of yet another spatial filter according to an embodiment of the present disclosure. As shown in FIG. 13, in some examples, the spatial filter may also include a multi-layer structure, and each layer structure may employ any one of the above filter structures. When the spatial filter structure includes a multi-layer filter structure, the in-band flatness and the band edge roll-off can be improved.

Further, in the embodiment of the present disclosure, as an example, the spatial filter includes two filter structures. The two filter structures have the same structure, that is, the parameters regarding the first electrode 11, the second electrode 21, the dielectric layer 30, and the like are the same.

In some examples, orthographic projections of the first electrodes 11 in different filter structures on any first dielectric substrate 10 do not necessarily completely overlap with each other, and may be arranged in a staggered manner, that is, there is a certain distance between the orthographic projections of the first electrodes 11 in different filter structures on any first dielectric substrate 10. Similarly, orthographic projections of the second electrodes 21 in different filter structures on any first dielectric substrate 10 do not necessarily completely overlap with each other, and may be arranged in a staggered manner, that is, there is a certain distance between the orthographic projections of the second electrodes 21 in different filter structures on any first dielectric substrate 10. In this case, the resonant units 100 in different filter structures may be arranged in a staggered manner.

Figure 14:
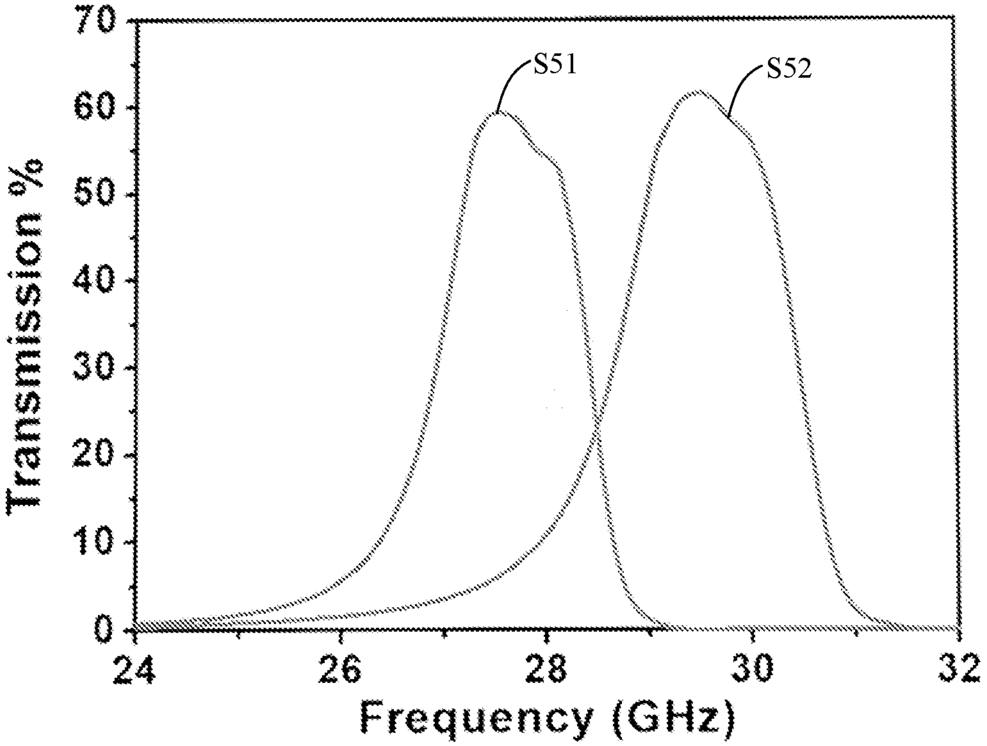
FIG. 14 is a resonant frequency-transmission curve for a spatial filter shown in FIG. 13.

As an example, the spatial filter includes two filter structures. FIG. 14 is a resonant frequency-transmission curve for a spatial filter shown in FIG. 13. As shown in FIG. 14, S51 represents a transmission curve when a director of the liquid crystal molecules of the liquid crystal layer is perpendicular to the first dielectric substrate 10, and S52 represents a transmission curve when the director of the liquid crystal molecules of the liquid crystal layer is parallel to the first dielectric substrate 10. FIG. 8 demonstrates that a frequency of a transmission peak can be effectively tuned by applying voltages to rotate the director of the liquid crystal molecules by 90 degrees in the region where the first electrode 11 and the second electrode 21 corresponding to each other overlap with each other.

Further, when the spatial filter includes a plurality of filter structures, the first dielectric substrate 10 of one of the adjacent filter structures is shared with (used as) the second dielectric substrate 20 of the other one of the adjacent filter structures, so that the thickness of the spatial filter can be effectively reduced, that is, the integration level of the spatial filter is improved. It should be noted that when the first dielectric substrate 10 of one of the adjacent filter structures is shared with the second dielectric substrate 20 of the other one of the adjacent filter structures, a thickness of the shared dielectric substrate should be selected according to a filter frequency band of the filter. Alternatively, the first dielectric substrate 10 of one of the adjacent filter structures and the second dielectric substrate 20 of the other one of the adjacent filter structures are adhered together by a first adhesive layer.

In some examples, a material of each of the first dielectric substrate 10 and the second dielectric substrate 20 includes, but is not limited to, glass. A material of each of the first electrode 11 and the second electrode 21 includes, but is not limited to, copper.

In some examples, the spatial filter of embodiments of the present disclosure has a filtering frequency tuning range greater than 1.5 Ghz. A bandwidth may be flexibly designed, and a 3 dB transmission bandwidth of 300 MHz to 800 MHz may be formed in a frequency band from n257 to n258. Within a 300 MHz bandwidth, an in-band flatness (in-band transmission variation) may be less than 1 dB. And a relatively steep band edge can be achieved.

In some examples, a size of each resonant unit in the spatial filter of the embodiment of the present disclosure may be adjusted by designing the sizes of the first electrodes 11 and the second electrodes 21, and the distance therebetween. The resonant unit 100 in the embodiment of the present disclosure may be formed as having a size in an order of a deep sub-wavelength (in a range of 1/10 to ⅕ of a free space wavelength), and thus may have a good angular insensitivity, and a filtering frequency offset is less than 150 MHz with the incident angle in a range of −45 degrees to 45 degrees.

For any spatial filter of the embodiments of the present disclosure, high voltages are applied to the first electrodes 11 and the second electrodes 21 in specific regions, and low voltages are applied to the first electrodes 11 and the second electrodes 21 in other regions, so that it can be seen that only a unit structure in the regions applied with the high voltages allows the incident electromagnetic wave to pass through the unit structure in a near field and a far field of 30 GHz, and the transmission in other regions is close to zero. This demonstrates the effectiveness of the spatial filtering with this passive matrix-driven structure.

In a second aspect, an embodiment of the present disclosure further provides a method for driving a spatial filter, where when the dielectric layer 30 in the filter structure is the tunable dielectric layer 30, the method for driving a spatial filter may include: changing the dielectric constant of the dielectric layer 30 by applying voltages to the first electrodes 11 and the second electrodes 21, to change the resonance frequency of the resonant units 100 to filter the electromagnetic wave.

In some examples, when the plurality of the first electrodes 11 and the plurality of the second electrodes 21 are included, the applying the voltages to the first electrodes 11 and the second electrodes 21 includes: applying the same voltage to the plurality of first electrodes 11 and applying different voltages to at least some of the plurality of second electrodes 21, so that the liquid crystal molecules in the resonant units 100 in each column are rotated by the same amplitude, which results in the same filter curve, and the filter curves on different columns are gradually offset in frequency.

In some examples, when the plurality of the first electrodes 11 and the plurality of the second electrodes 21 are included, the applying the voltages to the first electrodes 11 and the second electrodes 21 includes: applying different voltages to at least some of the plurality of first electrodes 11, and applying different voltages to at least some of the plurality of second electrodes 21.

Specifically, referring to FIG. 7, when a voltage difference between the first electrode 11 and the second electrode 21 corresponding to each other reaches V2, the liquid crystal molecules can change from an initial in-plane horizontal orientation to a vertical orientation, the same voltage of 2×V2 is applied to the first, second, fifth and sixth ones of the second electrodes 21, and the same voltage of V2 is applied to the third and fourth ones of the second electrodes 21; the same voltage of 2×V2 is applied to the first and second ones of the first electrodes 11, and the same voltage of 3×V2 is applied to the third, fourth, fifth and sixth ones of the first electrodes 11. In this case, since there is no voltage difference between the first electrode 11 and the second electrode 21 in the resonant units 100 in some regions, the liquid crystal molecules are not rotated, and the liquid crystal molecules in the resonant unit 100 in the other regions are completely rotated, so that a center frequency point of each of the filter curves in some regions is completely different from that each of the filter curves in other regions, and the filter performance in some regions can be controlled independently.

In a third aspect, an embodiment of the present disclosure provides an electronic device, which includes the spatial filter.

The spatial filter may be applied to a housing of an electronic device for preventing the electromagnetic interference. The frequency selective surface can further reduce a radar cross section (RCS) of an aircraft, or form a common aperture multiband nested antenna, or be applied to an antenna housing of a base station for assisting the antenna filtering.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A spatial filter, comprising at least one layer of filter structure; wherein the filter structure comprises a first substrate, a second substrate opposite to the first substrate, and a dielectric layer between the first substrate and the second substrate; wherein the first substrate comprises a first dielectric substrate and at least one first electrode on a side of the first dielectric substrate close to the dielectric layer; the second substrate comprises a second dielectric substrate and at least one second electrode on a side of the second dielectric substrate close to the dielectric layer; and the at least one first electrode intersects with the at least one second electrode, which defines at least one resonant unit configured to filter an electromagnetic wave;

wherein the resonant unit further comprises a first opening in the first electrode, and/or a second opening in the second electrode;

when the resonant unit comprises the first opening in the first electrode, and orthographic projections of the first opening and the second electrode on the first dielectric substrate intersect with each other; and when the resonant unit comprises the second opening in the second electrode, and orthographic projections of the second opening and the first electrode on the first dielectric substrate intersect with each other.

2. The spatial filter of claim 1, wherein the at least one first electrode comprises a plurality of first electrodes and the at least one second electrode comprises a plurality of second electrodes; the plurality of first electrodes extend along a first direction and are arranged side by side along a second direction; the plurality of second electrodes extend along the second direction, and are arranged side by side along the first direction; and the plurality of first electrodes intersect with the plurality of second electrodes, which defines a plurality of resonant units arranged in an array.

3. The spatial filter of claim 2, wherein the plurality of first electrodes have a same interval between every two adjacent first electrodes, and/or the plurality of second electrodes have a same interval between every two adjacent second electrodes.

4. The spatial filter of claim 2, wherein the plurality of first electrodes have a same size and/or the plurality of second electrodes have a same size.

5. The spatial filter of claim 2, wherein an interval between every two adjacent first electrodes is a first interval, and an interval between every two adjacent second electrodes is a second interval; and the first interval and the second interval are equal to each other.

6. The spatial filter of claim 1, wherein widths of the plurality of first electrodes and of the plurality of second electrodes are equal to each other.

7. The spatial filter of claim 1, wherein the dielectric layer comprises a liquid crystal layer.

8. The spatial filter of claim 1, wherein extending directions of the first electrode and of the second electrode in the filter structure are orthogonal to each other.

9. The spatial filter of claim 1, wherein the first electrode has a thickness in a range of 2 μm to 5 μm and/or the second electrode has a thickness in a range of 2 μm to 5 μm.

10. The spatial filter of claim 1, wherein the dielectric layer has a thickness in a range of 5 μm to 200 μm.

11. A method for driving the spatial filter of claim 1, comprising:

changing a dielectric constant of the dielectric layer by applying voltages to the at least one first electrode and the at least one second electrode, to change a resonance frequency of the at least one resonant unit to filter the electromagnetic wave.

12. The method of claim 11, wherein the at least one first electrode comprises a plurality of first electrodes and the at least one second electrode comprises a plurality of second electrodes; and the applying the voltages to the at least one first electrode and the at least one second electrode comprises: applying the same voltage to the plurality of first electrodes and applying different voltages to at least some of the plurality of second electrodes.

13. The method of claim 11, wherein the at least one first electrode comprises a plurality of first electrodes and the at least one second electrode comprises a plurality of second electrodes; and the applying the voltages to the at least one first electrode and the at least one second electrode comprises: applying different voltages to at least some of the plurality of first electrodes, and applying different voltages to at least some of the plurality of second electrodes.

14. An electronic device, comprising the spatial filter of claim 1.

15. The spatial filter of claim 1, wherein the at least one layer of filter structure comprises a plurality of layers of filter structures, which are stacked together.

16. A spatial filter, comprising at least one layer of filter structure; wherein the filter structure comprises a first substrate, a second substrate opposite to the first substrate, and a dielectric layer between the first substrate and the second substrate; wherein the first substrate comprises a first dielectric substrate and at least one first electrode on a side of the first dielectric substrate close to the dielectric layer; the second substrate comprises a second dielectric substrate and at least one second electrode on a side of the second dielectric substrate close to the dielectric layer; and the at least one first electrode intersects with the at least one second electrode, which defines at least one resonant unit configured to filter an electromagnetic wave, wherein the at least one layer of filter structure comprises a plurality of layers of filter structures, which are stacked together.

17. The spatial filter of claim 16, wherein the first dielectric substrate of one of two adjacent layers of filter structures is used as the second dielectric substrate of the other one of the two adjacent layers of filter structures.

18. The spatial filter of claim 16, wherein the first dielectric substrate of one of two adjacent layers of filter structures and the second dielectric substrate of the other one of the two adjacent layers of filter structures are adhered together by a first adhesive layer.

19. The spatial filter of claim 16, wherein orthographic projections of the resonant units in the plurality of layers of filter structures on one of the first dielectric substrates do not overlap with each other.

20. A spatial filter, comprising at least one layer of filter structure; wherein the filter structure comprises a first substrate, a second substrate opposite to the first substrate, and a dielectric layer between the first substrate and the second substrate; wherein the first substrate comprises a first dielectric substrate and at least one first electrode on a side of the first dielectric substrate close to the dielectric layer; the second substrate comprises a second dielectric substrate and at least one second electrode on a side of the second dielectric substrate close to the dielectric layer; and the at least one first electrode intersects with the at least one second electrode, which defines at least one resonant unit configured to filter an electromagnetic wave;

wherein the dielectric layer comprises a liquid crystal layer; and the spatial filter further comprises a first alignment layer on a side of a layer, where the at least one first electrode is located, close to the liquid crystal layer; and a second alignment layer on a side of a layer, where the at least one second electrode is located, close to the liquid crystal layer.

* * * * *